United States Patent [19]
Sachs

[11] 3,834,652
[45] Sept. 10, 1974

[54] FILM DRIVE FOR CINEMATROGRAPHIC APPARATUS

[75] Inventor: Günter Sachs, Ruit a. F., Germany

[73] Assignee: Eastman Kodak Company, Rochester, N.Y.

[22] Filed: Sept. 12, 1972

[21] Appl. No.: 288,473

[30] Foreign Application Priority Data
Oct. 6, 1971 Germany............... 7137843[U]
Oct. 6, 1971 Germany............... 7137842[U]

[52] U.S. Cl.................. 242/205, 74/24, 74/46
[51] Int. Cl. ............... B11b 15/32, G03b 1/04
[58] Field of Search ............. 242/201–205, 242/71.6; 352/166; 74/22, 24, 29, 45–50, 53

[56] References Cited
UNITED STATES PATENTS
3,115,785  12/1963  Simmons................ 74/125
3,570,783  3/1971   Winkler................. 242/205
3,706,427  12/1972  Theer.................... 242/205

*Primary Examiner*—Leonard D. Christian
*Attorney, Agent, or Firm*—John Morrow

[57] ABSTRACT

In a cinematographic apparatus, such as a camera or projector, an improved film coil winding mechanism is provided for advancing and winding a received film strip into a coil in a take-up chamber of the apparatus or in a received film cartridge. The coil winding mechanism includes a pawl which is mounted for reciprocal movement for advancing a cooperating ratchet member and thereby causing the film to be advanced. The pawl is driven in a first direction by drive means of the apparatus and energy is stored in the cooperating spring member such that when the pawl is released by the drive means and it becomes engaged with the ratchet member, the film is advanced as the pawl is driven in the reciprocal direction by the spring.

6 Claims, 4 Drawing Figures

FILM DRIVE FOR CINEMATROGRAPHIC APPARATUS

BACKGROUND OF THE INVENTION

1. Field Of The Invention

The invention relates to a drive mechanism for strip materials, and more particularly to a drive mechanism for a motion picture apparatus, such as a camera, for winding an exposed film strip into a take-up chamber of the camera.

2. Description Of The Prior Art

It is known in the motion picture camera art to wind exposed film into a film coil in the take-up chamber of a camera by using a drive mechanism which is geared to the drive motor of the camera. It is also known to use a friction clutch arrangement to compensate for the difference between the constant length of film advanced by the film feeding mechanism of the camera and the variable length of film which is advanced by the take-up drive as the diameter of the film coil varies. Although friction clutches have been used for such compensation, they are bulky and expensive and therefore not completely satisfactory. Another device is a pawl drive of the type disclosed in German Pat. No. 1,297,464 and the corresponding U.S. Pat. No. 3,570,783 issued to Winkler et al. on Mar. 16, 1971, but such a pawl structure is difficult to assemble. The present invention relates to an improvement over such a pawl mechanism which is more compact, inexpensive and provides for ease of assembly.

SUMMARY OF THE INVENTION

It is an object of the present invention to provide an improved film coil drive which is suitable for use in a film camera, such drive being compact, inexpensive and simple to assemble.

It is a further object of the present invention to provide a film coil drive for a camera which provides constant and reliable transmission of torque for advancing a film in such a camera.

It is another object of this invention to provide an improved film coil drive for a cine camera which is of simple design and construction, reliable and efficient in operation, and economical to manufacture.

In a preferred embodiment of the invention, a pawl member is driven in a first direction by a drive mechanism of the camera and is urged in the return direction by a cooperating spring means, such that the pawll applies an advancing force to a ratchet member of pawl take-up mechanism of the camera for advancing the film and winding it into a take-up coil.

The invention and its objects and advantages will become more apparent in the detailed description of the preferred embodiment presented below.

BRIEF DESCRIPTION OF THE DRAWINGS

In the following detailed description of a preferred embodiment of the invention, reference is made to the accompanying drawings in which.

DESCRIPTION OF THE PREFERRED EMBODIMENT

Because cinematographic apparatus are well known, the present description will be directed in particular to elements forming part of, or cooperating more directly with, the present invention, elements not specifically shown or described herein being understood to be selectable from those known in the art.

The particular embodiments of the invention shown in FIGS. 1 through 4 each result in the winding of film into the take-up chamber of a camera but do so by different arrangements or structures. To simplify discussion and to aid in an understanding of this invention, the parts in FIGS. 1 through 4 which are similar in structure and function are referred to by the same numeral even though the particular embodiment may necessitate a slightly different structure for the part.

Figure 1:
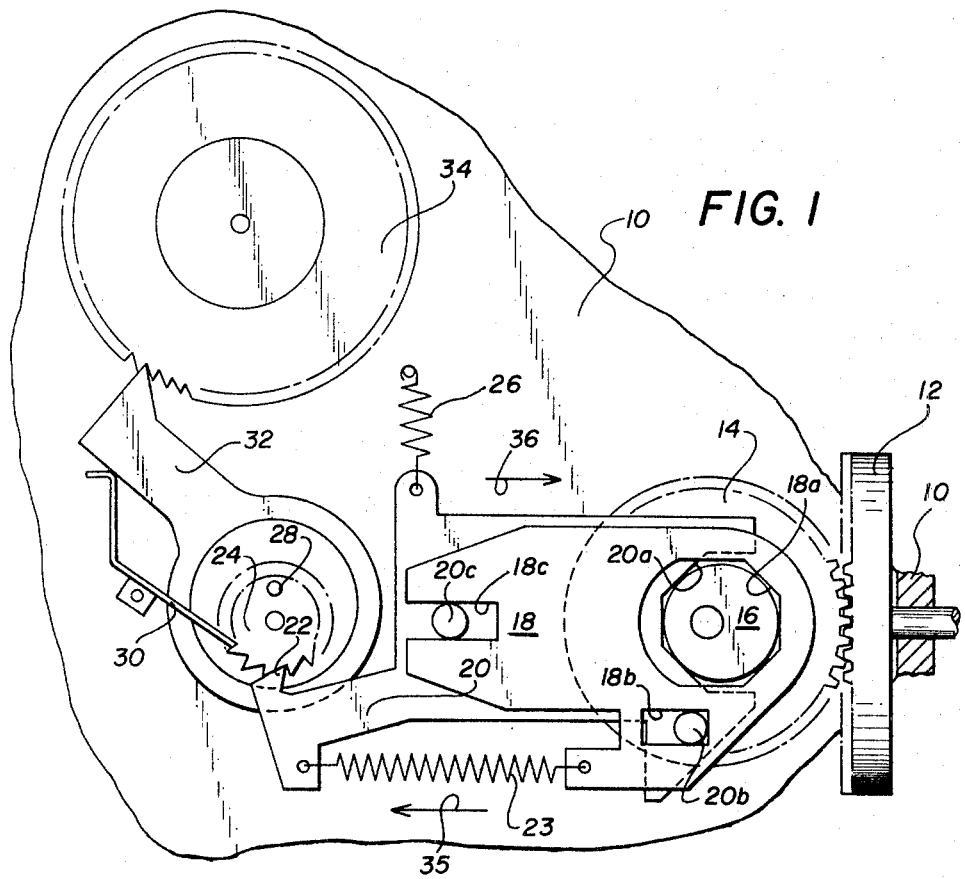
FIG. 1 is a fragmentary plan view, partially broken away, illustrating a specfic embodiment of a film coil drive for a cine camera according to the invention.

Referring now in detail to FIG. 1, a toothed wheel or gear 14 is in mesh with a crown wheel 12 which is of a known type used in a camera drive train and which is shown rotatably secured to a portion of the camera housing 10. An eccentric 16 is connected with the toothed wheel 14, the two parts being preferably an integral component. Sliding members 18 and 20 include cutaway portions defined by surfaces 18a and 20a and the members are mounted to engage the eccentric 16 with the drive surfaces 18a and 20a, respectively. The sliding members 18 and 20 are mounted for relative motion along their longitudinal axis, and during such motion, the pins 20b and 20c which are secured to sliding member 20 slide in slots 18b and 18c respectively, of sliding member 18, these pin-and-slot connections serving to guide both of the members. Besides these connections, the sliding members 18 and 20 are also positively and resiliently connected by a spring 23 which urges the sliding members 18 and 20 toward a position such that the drive surfaces 18a and 20a approach each other. Due to the length and positioning of the slot 18b of the sliding member 18, when the end lift surface of slot 18b is urged against the pin 20b, the two drive surfaces 18a and 20a are spaced at a distance which is slightly larger than the diameter of the eccentric 16. Thus, there is only very little friction on the eccentric 16 during its rotation and the drive surfaces 18a and 20a do not contact or brake the surface of eccentric 16 unnecessarily.

The sliding member 20 has a transport tooth or pawl portion 22 which engages the film coil drive wheel or ratchet 24 in a typical ratchet and pawl fashion. Pawl 22 is urged into engagement with the film coil ratchet 24 by a spring 26 which is secured to the sliding member 20 and to a portion of the camera housing 10 by conventional means. The film coil ratchet rotates the film coil (not shown) by means of an eccentric pin 28 which cooperates with the take-up reel or spool such as in a film cartridge (not shown). The ratchet 24 is arranged such that it can only be rotated in the take-up direction due to the reverse-action stop 30. In the embdoiment shown in FIG. 1, sliding members 18 and 20 are arranged to pass through housing walls (not shown), the walls forming a guide channel for the sliding members. Furthermore, as is well known, the stop 30 and gear members 32 and 34 cooperate with the film-coil drive wheel to form a film-length measuring and indicating device.

In operation of a film coil drive according to the above-discussed embodiment of the invention, toothed wheel 14 is rotated by crown wheel 12 and the eccentric 16 causes the two sliding members 18 and 20 to reciprocate such that the ratchet 22 drives the film coil drive wheel 24 in the take-up direction when the sliding members perform the working stroke in the direction of the arrow 36. In the idle stroke which takes place in the direction of the arrow 35, the sliding members 18 and 20 are returned by at least one pitch of th film coil drive wheel 24. When, in the idle stroke, the sliding member 20 passes over the toothing of the film coil drive wheel 24 under the urging of the spring 26, the reverse-action stop 30 prevents reverse rotation of the film coil drive wheel 24. If the latter can rotate no further because the film fed by the film feeding mechanism has been completely wound and the tension in the film is thereby greater than the force applied by spring 23, sliding member 20 is restrained from further movement, while the sliding member 18 continues to be driven by the eccentric 16. The result in a relative motion between two sliding members 18 and 20 causes the spring 23 to be continuously brought under tension and relaxed. When the film coil drive wheel 24 can be rotated again because more film has been fed by the film feeding mechanism and the film is no longer under tension, the spring 23 urges the sliding member 20 in the direction of the arrow 36 so that winding up of the film is again continued.

Figure 2:
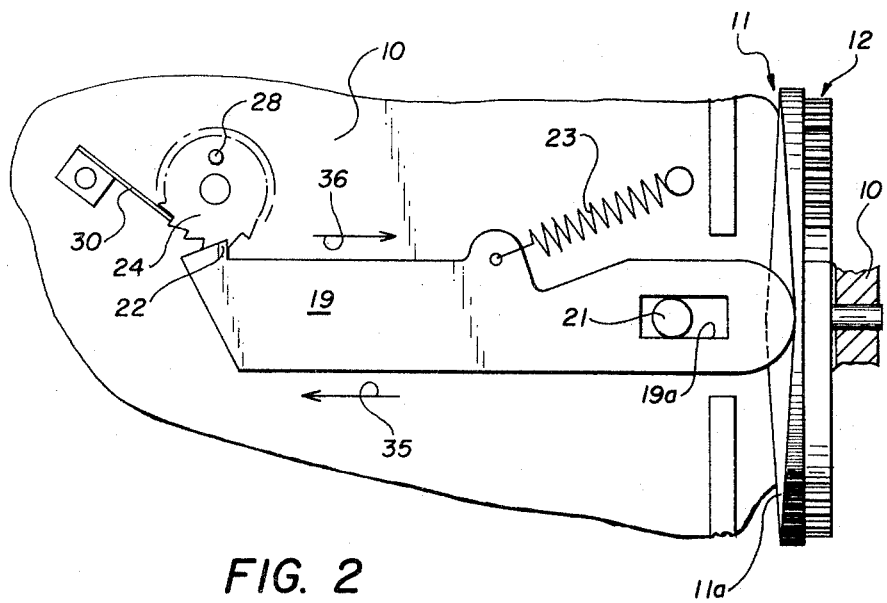
FIGS. 2 through 4 are fragmentary plan views, partially broken away, illustrating other embodiments of a film coil drive for a cine camera.

Referring now to FIG. 2, a gear or toothed wheel 12 of the camera mechanism is shown mounted in a portion of the camera housing 10. A cam member 11 is provided with a face cam 11a. Member 11 is operably connected with the toothed wheel 12 and is preferably integral therewith. As in the previously described embodiment, the film coil drive wheel or ratchet 24 which drives the take-up reel or a similar part of a film cartridge (not shown) by a drive pin 28 and the stop latch 30 prevents a reverse action of the film coil drive wheel 24.

According to the embodiment of the invention shown in FIG. 2, a sliding member 19 engages the cam surface 11a of the member 11 under the influence of the spring 23. The sliding member 19 is guided for translatory movement by the pin 21 which is secured to a portion of the camera housing 10 fitting into a slot 19a in the member 19. The pawl 22 engages the ratchet 24 under the influence of the spring 23 to drive the ratchet 24 when the member 11 drives the sliding member 19 in a reciprocating manner. Of course, the stroke imparted to member 19 by cam surface 11a is at least equal to one pitch of the film coil drive wheel 24.

When the film web has been wound tight so that the take-up coil can be rotated no further, the sliding member 19 and the film coil drive wheel 24 continue to be urged by spring 23 in the direction of arrow 36 until the film feeding mechanism has fed further film from the supply spool so that the take-up spool can be driven again. This is effected by the spring 23 pulling the sliding member 19 to the right so that it engages the face cam 11a to resume its translatory motion. Rotation of the member 11 is ineffective to move the sliding member 19 through a full range of movement when the ratchet 24 cannot be advanced by pawl 22.

Figure 3:
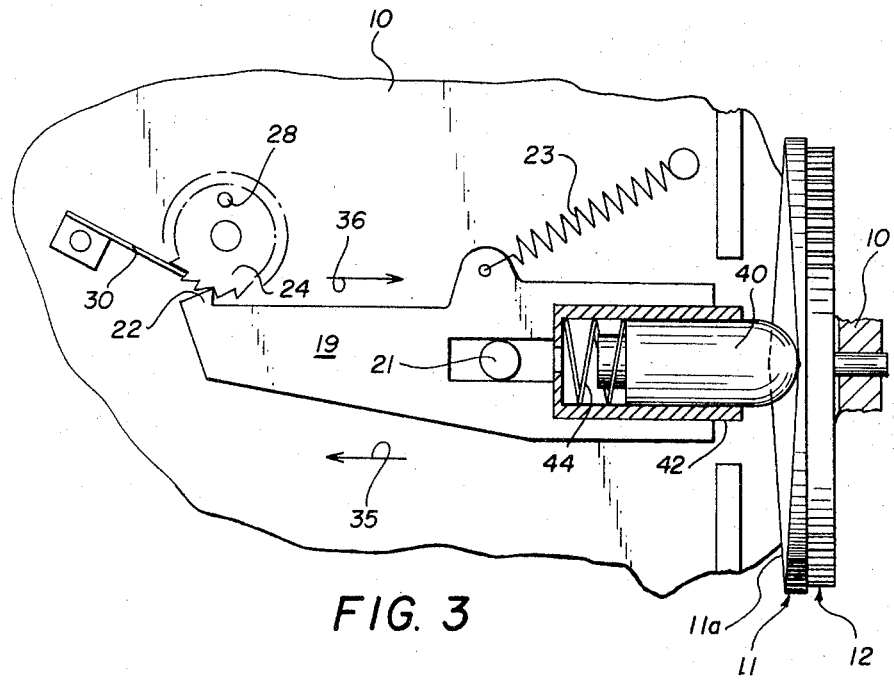

When the sliding member 19 moves to re-engage the face cam 11a there may be a slight noise and a higher load on the face cam 11a. If this is objectionable, it can be avoided by the embodiment according to FIG. 3. As shown in FIG. 3, the drive imparted by the cam face 11a is transmitted to the sliding member 19 by a spring-mounted sensor which comprises a peg or pin 40 disposed in a chamber in a shell 42, the latter being secured to sliding member 19. Pin 40 is urged against the cam face by a spring 44 in the chamber, the spring 44 being stronger than spring 23, since the former must overcome the force of the latter during the motion of the sliding member 19.

Figure 4:
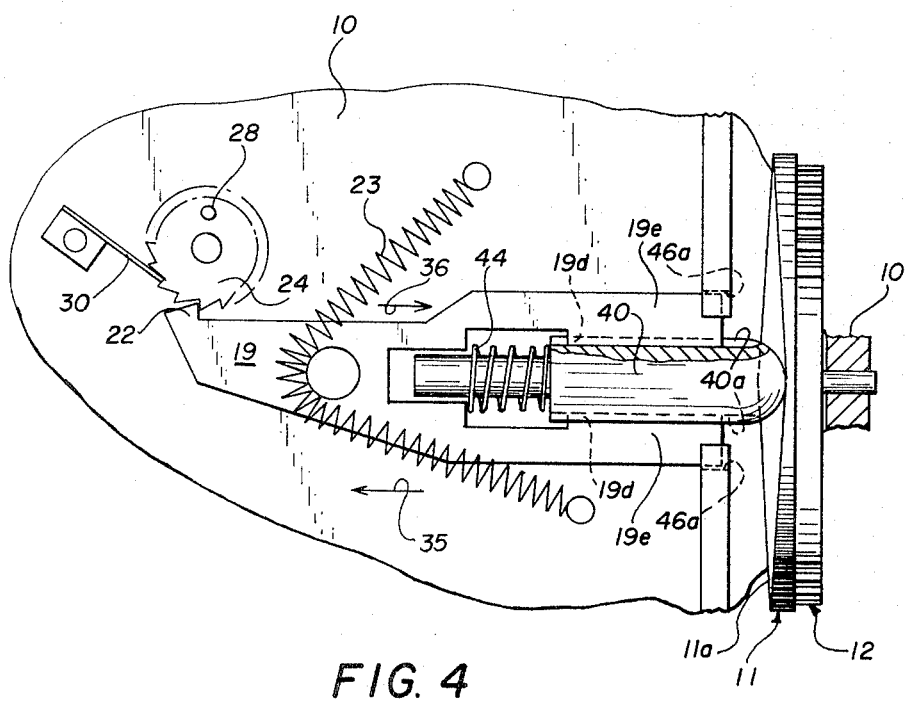

The embodiment according to FIG. 4 differs from that shown in FIG. 3 in the way the pin 40 is held in position relative to the sliding member 19, i.e., there is provided a cooperating tongue-and-groove connection 40a and 19d. Furthermore, the sliding member 19 is not guided by a pin-and-slot connection (as in FIG. 3), but by recesses 46a of the plate 46 receiving two opposed lateral edges 19e of the sliding member 19. To ensure low friction on the sliding member 19, the spring 23 is mounted in the housing 10 of the camera with both ends passed around a pin 19c of the sliding member 19.

The invention has been described in detail with particular reference to a preferred embodiment thereof, but it will be understood that variations and modifications can be effected within the spirit and scope of the invention.

I claim:

1. A winding mechanism for winding a received film in a cinematographic apparatus, said mechanism comprising:
   a. a winding means for winding the film strip into a coil, said winding means including a ratchet portion;
   b. a member mounted for movement in first and second opposite directions, said member including a pawl portion for cooperating with said ratchet portion of said winding means for driving said winding means when the member is moved in said second direction;
   c. drive means engageable with said member to positively drive said member in said first direction and to resiliently urge said member in said second direction, the drive means being ineffective to move the member in said second direction to operate the winding means if the resistance offered by the winding means exceeds the force exerted by the drive means for moving the member in said second direction; and
   d. a stop member engageable with the ratchet portion of said winding means to permit rotation of said winding means in only one direction.

2. Apparatus as set forth in claim 1 wherein said drive means comprises:
   a. a sliding member mounted for movement in first and second opposite directions;
   b. resilient means coupling said first-mentioned member and said sliding member for urging said first-mentioned member in said second direction when said sliding member is moved in said second direction; and
   c. an eccentric for cooperating with said first-mentioned member and said sliding member for urging said first-mentioned member in said first direction and for urging said sliding member in said second direction.

3. In apparatus having coil winding means for advancing and winding a received web material into a coil, the improvement comprising:
   a. a sliding member mounted for reciprocal movement and operably coupled to the coil winding means to effect operation of the coil winding means to cause said web material to be wound into a coil in response to movement of said sliding member;
   b. drive means comprising a rotatable face cam;
   c. a pin resiliently coupled to said sliding member, said pin having a portion engageable with said face cam for effecting movement of said sliding member in a first direction in response to rotation of said face cam; and
   d. resilient means coupled to said sliding member for storing energy when said sliding member is driven in said first direction, said resilient means being operable to yieldably urge said sliding member in a second direction, said sliding member effecting operation of the coil winding means when said sliding member is moved in said second direction by release of the stored energy.

4. In apparatus as set forth in claim 3 further comprising guide means coupled to said sliding member for guiding said sliding member relative to the face cam.

5. Apparatus for winding a received web material into a coil in a camera, said apparatus comprising:
   a. winding means including a ratchet portion for permitting said winding means to be rotatably driven, said winding means being adapted to receive the web material and to wind the web material into a coil;
   b. a pawl mounted for movement in first and second directions, said pawl being adapted to cooperate with said ratchet portion to drive said winding means as said pawl is moved in said second direction;
   c. drive means comprising a rotatable cam member;
   d. a cam follower comprising a pin resiliently coupled to said pawl, said cam follower cooperating with said cam member for driving said pawl in said first direction in response to rotation of said cam member;
   e. resilient means coupled to said cam follower for storing energy when said cam follower is driven in said first direction, said resilient means being operable to urge said pawl in said second direction as said stored energy is released, thereby effecting operation of the winding means; and
   f. guide means coupled to said pawl for guiding said pawl realtive to said cam member.

6. Apparatus as set forth in claim 5 further comprising a stop member engageable with said ratchet portion of said winding means to permit operation of said winding means in only one direction.

* * * * *